United States Patent [19]

Heller, Jr. et al.

[11] 4,000,760
[45] Jan. 4, 1977

[54] PLASTIC HOSE HAVING EMBEDDED REINFORCING BRAID

[75] Inventors: William C. Heller, Jr., Milwaukee, Wis.; Alfred F. Leatherman, Columbus, Ohio

[73] Assignee: William C. Heller, Jr., Milwaukee, Wis.

[22] Filed: Jan. 26, 1976

[21] Appl. No.: 652,205

Related U.S. Application Data

[62] Division of Ser. No. 404,095, Nov. 5, 1973, Pat. No. 3,945,867.

[52] U.S. Cl. .................................. 138/141; 138/177
[51] Int. Cl.² ............................................ F16L 9/12
[58] Field of Search .......................... 138/123–127, 138/141, 145, 146; 156/143, 149, 287, 272

[56] References Cited

UNITED STATES PATENTS

| 3,253,618 | 5/1966 | Cook | 138/125 |
| 3,253,619 | 5/1966 | Cook et al. | 138/125 |
| 3,370,115 | 2/1968 | Wood | 156/287 |
| 3,620,875 | 11/1971 | Gugliemo et al. | 156/272 |

*Primary Examiner*—Charles E. Phillips
*Attorney, Agent, or Firm*—Andrus, Sceales, Starke & Sawall

[57] ABSTRACT

A hose includes a hollow plastic core having an indirectly heatable agent bonded to the exterior thereof by a heat seal. A reinforcing net is embedded in the agent and the composite structure covered with a coating.

10 Claims, 9 Drawing Figures

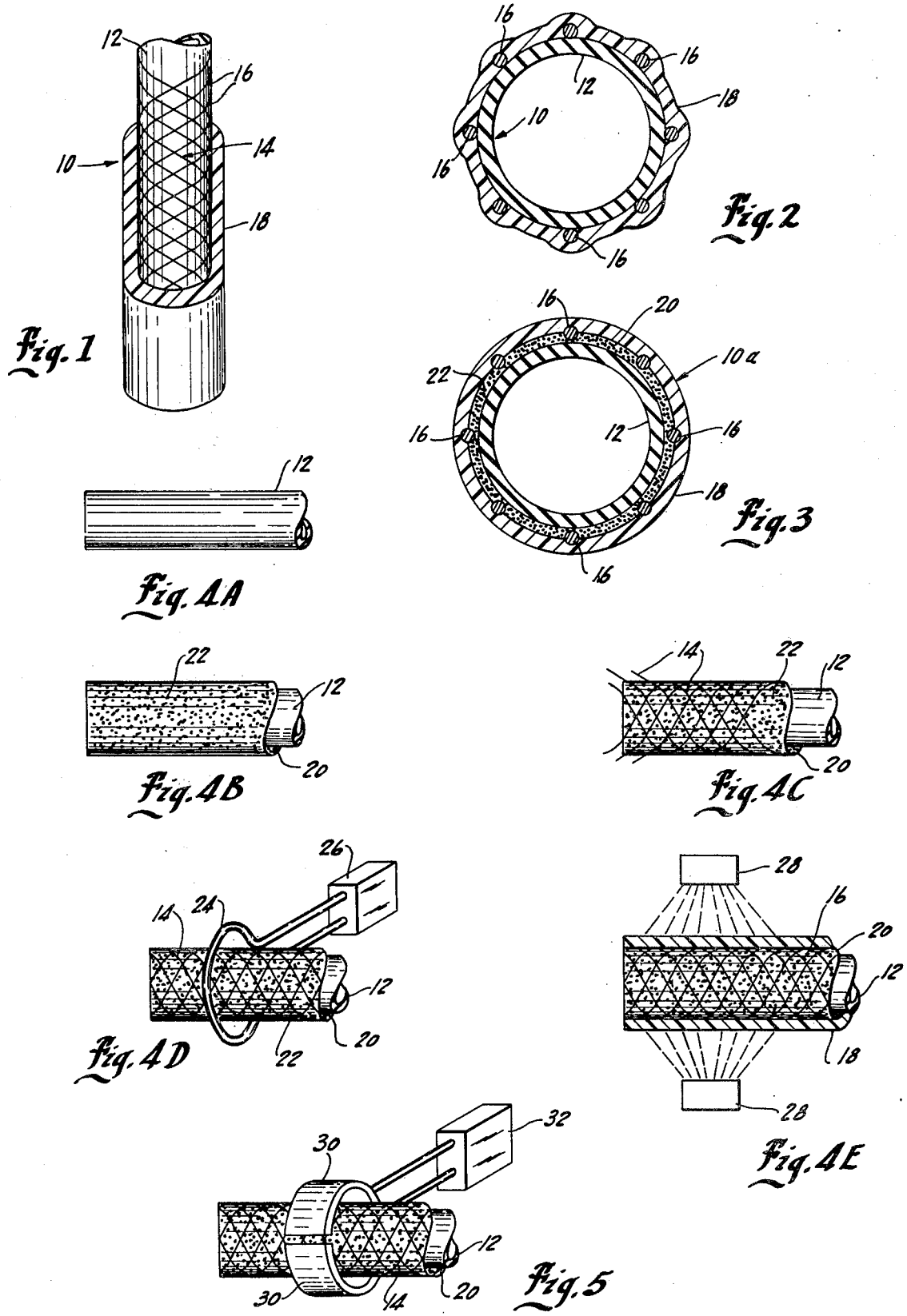

PLASTIC HOSE HAVING EMBEDDED REINFORCING BRAID

CROSS REFERENCE TO RELATED APPLICATION

This application is a divisional application of copending application, Ser. No. 404,095, filed Nov. 5, 1973 and now U.S. Pat. No. 3,945,867.

BACKGROUND OF THE INVENTION

1. Field of the Invention

The present invention relates to a hose incorporating a cylindrical, braided, reinforcing means.

2. Description of the Prior Art

Flexible plastic hose has come into wide usage because of its ruggedness, resistance to deterioration, suitability for a wide variety of fluids, and other desirable properties. These uses range from sanitary applications in the food and drug industry to hydraulic and pneumatic applications, as in braking and other control systems. The latter may involve internal pressure of considerable magnitude, for example 500 psi working pressures and 2,000 psi burst strengths, or more. In order to provide light weight while at the same time providing the necessary strength to resist the circumferential and longitudinal forces exerted on the hose, reinforcement in the form of a surrounding tubular net is utilized.

A typical plastic hose includes an inner tubular core. Nylon is often used for this purpose because of its inertness, chemical properties, strength, and for other reasons. The reinforcing net is placed around the core and the composite structure coated with a plastic having abrasion resistance, coloration, and similar properties.

At present, many types of hoses constructed in accordance with the foregoing technique are prone to kinking and rippling when bent. When the hose is cut, the reinforcing net is subject to fraying and/or unraveling.

These defects are traceable to the lack of adequate adherence of the net and coating to the nylon core of the hose. While adhesion of the net to the core would overcome these defects, the lubricous properties which render nylon so suitable as a hose core material also make it difficult to join the net and coating to the core, as by glue or adhesives.

SUMMARY OF THE PRESENT INVENTION

It is, therefore, the object of the present invention to provide an improved plastic hose in which the net is secured to the core in an improved manner thereby overcoming the shortcomings noted above.

The present invention contemplates a plastic hose having an indirectly heatable bonding agent about the exterior of the core. The bonding agent is selected to be heat sealable to the core and to be thermally deformable. The reinforcing net is positioned around the bonding agent. The agent and net are brought into locking engagement, as by partially embedding the net in the agent, by heat induced deformation. The corenet assembly may then be coated. The article of the present invention thus exhibits mechanical joinder of the net to the agent and bonding joinder of the agent to the core. The mechanical engagement of the net and agent not only eliminates the kinking and fraying heretofore experienced, but also provides a smoother surface for the exterior coating of the pipe, through the partial embedment of the net in the agent. This reduces abrasion and wear.

Preferably, the agent has dispersed therein a particulate susceptor, heatable upon exposure to a selected form of indirectly applied energy, for example, a high frequency magnetic or electric field. Such susceptors may comprise inductively heatable metallic oxides such as an iron oxide, or dielectrically heatable compounds, such as polyvinyl chloride.

BRIEF DESCRIPTION OF THE DRAWING

FIG. 1 is a perspective view of a plastic hose of the type to which the present invention pertains.

FIG. 2 is a cross-sectional view of a plastic hose showing the prior art construction.

FIG. 3 is a cross-sectional view similar to that shown in FIG. 2 showing a plastic hose constructed in accordance with the present invention.

FIGS. 4a through 4e show steps in the method of making the plastic hose of the present invention.

FIG. 5 shows an alternative step in the method for making the plastic hose of the present invention.

DESCRIPTION OF THE PREFERRED EMBODIMENT

Turning now to FIG. 1, there is shown therein plastic hose 10. Plastic hose 10 includes hollow core 12. Surrounding core 12 is a reinforcing net 14. Net 14 is formed of a lattice of strands 16 capable of receiving tensile forces and thus serves to resist the circumferential and longitudinal forces exerted on plastic hose 10 by the presence and passage of fluids through core 12. Coating 18 is provided over core 12 and net 14.

A plastic hose of the foregoing type constructed in accordance with the prior art is shown in cross section in FIG. 2. As will be noted from the Figure, strands 16 of net 14 lie along the exterior surface of core 12. This positioning, along with the absence of a bond between strands 16 and core 12, causes the kinking and rippling upon bending and the fraying and unraveling upon cutting noted earlier.

FIG. 3, on the other hand, shows the improved plastic hose 10a of the present invention. Plastic hose 10a includes core 12. Core 12 may be formed of a variety of materials. Nylon, typically nylon 11, may be used because of its strength and resistance to the effects of oil and water. Ethylene vinyl acetate may be used for food applications, such as milk handling.

In plastic hose 10a indirectly heatable bonding agent 20 is heat sealed to the exterior of core 12. Strands 16 of net 14 are at least partially embedded in agent 20 obviating the shortcomings heretofore encountered in the use of plastic hose. As noted supra, attainment of the features of the present invention depends on the mechanical engagement of the agent and net produced by this embedment and the heat seal between the agent and the core.

The bonding properties of agent 20 may be selected by considering its joinder to core 12. As such, bonding agent 20 may be a material similar to core 12, for example, a nylon 11 bonding agent for a nylon 11 core or a different material, the important consideration being the heat sealability or fusibility of the bonding agent to the core. Net 14 may be formed of orientable polymer yarn, typically polyester or nylon, or other suitable material. Bonding agent 20 typically posesses substantial bonding incompatability with net 14. Strands 16 of net 14 may be woven or braided or may comprise a plurality of parallel filaments as in a roving. Strands 16 may or may not intersect and may or may not be knotted at their intersections in forming net 14. With certain types of net and bonding agent materials, a greater or lesser amount of bonding may occur between these two elements but the primary coaction between the elements is the mechanical engagement noted above.

In order to provide this mechanical engagement the layer of bonding agent must be of appreciable thickness. While the exact thickness of the layer depends to some extent on the diameter of strands 16 and their material type, the layer of bonding agent is typically 5 to 10 mils (0.005–0.01 inch) thick. This is considerably in excess of adhesive coatings which tend to be less than 2 mils in thickness.

Another feature of the present invention is the manner in which the heating of bonding agent 20 is obtained. As can be appreciated, it is difficult to heat agent 20 with conventional means such as burners and heated platens and, at the same time, apply net 14. External heat also is likely to damage net 14.

The present invention therefore contemplates rendering the agent itself heatable upon exposure to a selected form of indirectly applied energy. By the term "indirectly applied" is meant that the energy is applied in the form of an electromagnetic field, for example, alternating magnetic or electric fields, rather than through the direct application of heat as by heated platens and the like. This may be accomplished by dispersing in agent 20 a particulate susceptor 22 heatable upon exposure to the indirectly applied energy, as shown in FIG. 3.

In the instance in which the indirect energy is applied in the form of an alternating magnetic field, susceptor material 22 may comprise an inductively heatable substance. Susceptors comprising, at least in part, nonconductive metallic oxides having ferromagnetic properties are suitable for use as an inductively heatable susceptor material. Ferrite materials may be used. The oxide compounds gamma $Fe_2O_3$, $Fe_3O_4$, and $CrO_2$ have been found to be useful susceptor materials. In addition to their high heat generating properties by hysteresis losses, such compounds may be reduced to extremely small size. This size reduction is without loss of heat generating properties and facilitates the dispersion of susceptor 22 in agent 20. Metallic oxide susceptors may be reduced to submicron particle sizes, for example, 0.01 microns. A typical maximum particle size is 20 microns.

In the instance in which the indirect energy is applied in the form of an alternating electric field, susceptor 22 may comprise a polar material heatable by dielectric losses. The polymers and copolymers of vinyl chloride, vinyle fluoride, vinylidene chloride, and vinylidene fluoride are suitable for use as dielectrically heatable susceptors. Polyvinyl chloride has been found useful.

Turning now to FIG. 4, typical steps in the process of making plastic hose 10a are illustrated. A hollow plastic core 12 shown in FIG. 4a is provided by conventional methods. Bonding agent 20 containing dispersed susceptor particles 22 may be obtained by a plurality of methods. For example, the granulated thermoplastic material of agent 20 and the particulate susceptor material 22 may be dry mixed together in the desired quantities in preparation for application to core 12. Depending on the type of thermoplastic material comprising agent 22 and the degree of dispersion desired, it may be necessary to pass this admixture through an extruder, regranulate the once extruded composition and reextrude it, as for example, directly on to the core.

More specifically, the bonding agent may be coextruded on the exterior of core 12 as the core is formed or the bonding agent may be extruded on an already formed core. The bonding agent may be formed as a film and wrapped on the exterior of core 12 or applied in liquid form. Yet another alternative is applying bonding agent 20 to strands 16 so that the bonding agent is applied to the core as net 14 is formed. The efficiencies obtainable by the process of the present invention permit the use of relatively low particle loading, for example 3 to 10% (preferably 8 to 10%) by weight with respect to the bonding agent 20.

Net 14 is then placed or drawn on the exterior of agent 20 as shown in FIG. 4C, by conventional means. Thereafter, core 12, agent 20, and net 14 are passed through induction heating coil 24. See FIG. 4D. Induction heating coil 24 is energized by high frequency alternating current power supply 26 so as to generate a high frequency magnetic field in the interior of the coil. A frequency range for the magnetic field of from 0.4 to 6 megahertz has been found suitable although useful heat is also achieved at higher frequencies up to a typical maximum of 30 megahertz for a conventional coil. The energization of coil 24 applies a high frequency magnetic field to agent 20 which generates heat in susceptor particles 22 causing the agent to become heated and deformable so as to permit the embodiment of strands 16 in the exterior of the core and the heat sealing of agent 20 to core 12. The embedment may be accomplished by the exudation of the hot bonding agent through the openings in net 14, by the circumferential tension existing in strands 16 and by any thermoshrinking of strands 16 which may be present. A pressure means (not shown) may be applied to the exterior of agent 20.

The amount of time that agent 20 must be exposed to the magnetic field of coil 24 depends on the type of material utilized for agent 20, the concentration of susceptor material 22, the degree of embedment of strands 16 desired, the strength and frequency of the magnetic field, and other factors. However, because of the efficiencies obtainable with the technique of the present invention, only a short period of time is normally required to obtain the necessary softening of the exterior of agent 20. Times less than one second are common. In the case in which plastic hose 10 is being continuously formed in a processing line, the exposure time may be regulated by the velocity at which the hose passes through heating coil 24.

After passing through induction heating coil 24, agent 20 having net 14 embedded therein may be cooled by air blasts or the like. Agent 20 and net 14 are then coated with coating 18 as by spray guns 29 or by some other means such as a coater, extruder, brushes, or the like. See FIG. 4E. Coating 18 may typically be urethane rubber. This completes the manufacture of plastic hose 10a. It will be appreciated that coating 18 may be applied prior to heating bonding agent 20 if desired.

In the instance in which susceptor particles 22 are dielectrically heatable, a high frequency electric field may be formed between two plate-like electrodes 30 connected to high frequency generator 32, as shown in FIG. 5.

A typical embodiment of the invention comprises a hose having a nylon 11 core. A concentric coextruded layer of nylon 11 bonding agent 10 mils thick and containing 10% by weight of gamma $Fe_2O_3$ particles is provided over the core. The net is formed of polyester yarn. The outside diameter of the product is approximately 0.6 inches.

The induction heating coil utilized to treat the hose described above consisted of two parallel windings providing a total of 28 turns of 3/16 inch insulated tubing. The axial length of the coil was 6/182 inches. The coil was energized by an induction heating generator operating at approximately 3.5 MHz with approximately 200 amperes of r-f current feeding each winding.

The velocity at which hose 10a passed through the coil was such as to expose a given point on the hose to the magnetic field of the coil for 0.6 seconds. This exposure caused sufficient melting of the nylon bonding agent to cause the nylon to exude outward through many small openings in the net and become visible on the exterior of the net in small quantities, thus locking the net to the core upon cooling. The product was suitable for receiving a coating of urethane rubber.

Various modes of carrying out the invention are contemplated as being within the scope of the following claims particularly pointing out and distinctly claiming the subject matter which is regarded as the invention.

We claim:

1. A composite plastic hose article comprising:
   a generally dimensionally stable hollow plastic core suitable for receiving and conveying an internal pressure producing fluid;
   a tubular fabric net surrounding the core for reinforcing the core against the pressure of the fluid; and
   a layer of thermally softenable material interposed between said core and said net, said material being bondable to the core by thermal fusion but possessing substantial bonding incompatability with said net, said layer being bonded to the core by a thermal fusion bond and having said net at least partially embedded therein for mechanical retention in said layer, said material having uniformly dispersed therein a particulate susceptor having a size range of submicron to 20 microns and heatable upon exposure to a selected form of indirectly applied energy, said layer being applied to said core in a thickness no greater than that which obtains a restraining partial embedment of the net in said layer.

2. The plastic hose article of claim 1 further defined as including a coating over the core-net assemblage.

3. The plastic hose article of claim 1 wherein said thermally softenable material has a thickness of approximately 5 mils or more in the portions which do not engage the net.

4. The plastic hose article of claim 3 wherein said thermally softenable material has a thickness of approximately 5 to 10 mils in the portions which do not engage the net.

5. The plastic hose article of claim 1 wherein said particulate susceptor is inductively heatable by an alternating magnetic field.

6. The plastic hose article of claim 5 wherein said particulate susceptor comprises particles of non conductive metallic oxides having ferromagnetic properties.

7. The plastic hose article of claim 6 wherein said particulate susceptor is selected from a class consisting of gamma $Fe_2O_3$, $Fe_3O_4$, and $CrO_2$.

8. The plastic hose article of claim 7 wherein the particulate susceptor is present in said bonding agent in amounts of from 3 to 10% by weight with respect to the bonding agent.

9. The plastic hose article of claim 7 wherein said particulate susceptor is present in said bonding agent in amounts of from 8 to 10% by weight with respect to the bonding agent.

10. The plastic hose article of claim 1 wherein said particulate susceptor means is dielectrically heatable by an alternating electric field.

* * * * *

UNITED STATES PATENT AND TRADEMARK OFFICE
CERTIFICATE OF CORRECTION

PATENT NO. : 4,000,760
DATED : January 4, 1977
INVENTOR(S) : William C. Heller, Jr. & Alfred F. Leatherman It is certified that error appears in the above-identified patent and that said Letters Patent are hereby corrected as shown below:

Column 3, Line 52, Cancel "vinyle" and substitute therefor ---vinyl---

Column 4, Line 27, Cancel "embodiment" and substitute therefor ---embedment---

Column 4, Line 53, Cancel "29" and substitute therefor ---28---

Column 5, Line 7, Cancel "6/182" and substitute therefor ---6 3/4---

Signed and Sealed this

Seventeenth Day of May 1977

[SEAL]

Attest:

RUTH C. MASON
Attesting Officer

C. MARSHALL DANN
Commissioner of Patents and Trademarks